(12) United States Patent
Ivory et al.

(10) Patent No.: US 7,775,096 B2
(45) Date of Patent: Aug. 17, 2010

(54) WHEEL BASED SENSOR ASSEMBLY

(75) Inventors: Jonathan David Ivory, Akron, OH (US); David Alexander Farwell, Atwater, OH (US); Graham Alexander Carney, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/251,850

(22) Filed: Oct. 15, 2008

(65) Prior Publication Data

US 2010/0089139 A1    Apr. 15, 2010

(51) Int. Cl.
*G01M 17/02* (2006.01)
(52) U.S. Cl. ..................................................... 73/146
(58) Field of Classification Search ................. None
See application file for complete search history.

(56) References Cited

U.S. PATENT DOCUMENTS 4,723,444 A * 2/1988 Hajek .......................... 73/146

\* cited by examiner

*Primary Examiner*—Lisa M Caputo
*Assistant Examiner*—Jermaine Jenkins
(74) *Attorney, Agent, or Firm*—Richard B. O'Planick

(57) ABSTRACT

A wheel and sensor assembly includes a U-shaped bracket assembly mounting to and moving with a wheel assembly. One or more sensor device(s) such as camber angle and slip angle sensors mount to the bracket assembly for operatively measuring one or more wheel assembly parameter(s) during vehicle use. The bracket assembly mounts to the wheel assembly and turns therewith. The bracket assembly positions the sensor device(s) in operative optimal proximity to the road surface during vehicle use under actual operating conditions.

12 Claims, 4 Drawing Sheets

US 7,775,096 B2

WHEEL BASED SENSOR ASSEMBLY

FIELD OF THE INVENTION

The invention relates generally to sensor assemblies for measuring tire operational parameters and, more specifically, to sensor assemblies for generating tire-specific measurements data during vehicle use at high speed.

BACKGROUND OF THE INVENTION

In the operation of passenger cars and racecars, it is desirable to measure and test tires, wherever practical, in real time and under actual road conditions. For passenger cars, the venues of interest may be carefully selected road conditions while, for racecars, it is the operating conditions on a particular racetrack. The purpose for observing, testing, and measuring tire operating parameters in real time and under actual road conditions is to provide real world feedback on tire performance and to allow for the creation of more accurate tire durability test procedures and methods.

The specific tire parameters to be measured and evaluated may include tire slip and camber angles or tire deflection. Heretofore, the ability of the industry to test, measure, and evaluate tires for such tire parameters while the tire is at high speeds has not been available. Consequently, the tire testing procedures and methods utilized within the industry have been created without benefit of real time measurement of such tires under actual operating conditions.

SUMMARY OF THE INVENTION

An aspect of the invention embodies a wheel-based sensor assembly. The assembly includes a rotational wheel assembly, the wheel assembly including a wheel rim and a tire mounted thereto. One or more sensor device(s) are provided for operatively measuring one or more wheel assembly parameter(s) while the wheel assembly rotates during vehicle use. A bracket assembly mounts to the vehicle and operatively positions the sensor device(s).

In another aspect, the bracket assembly includes a first bracket arm segment extending at least partially along an outer sidewall of the tire in a radial direction and a sensor device adjustably repositionable along the arm segment. The bracket assembly may further include a second bracket segment extending at least partially along a tread region of the tire in an axial direction, preferably to a side of the tire opposite a normatively forward vehicular direction of travel. A secondary sensor device may be mounted to the second bracket arm segment adjacent the tread region of the tire.

In another aspect, the first and second bracket arm segments are relatively disposed at a ninety degree angle and include a channel along a tire-facing bracket side to operatively receive and route electrical wiring along the bracket assembly. The bracket assembly may be constructed in a U-shaped configuration connecting the second bracket member segment to an inner side of the wheel assembly by a third bracket arm segment. The sensor units may include a slip angle sensor mounted to the first bracket arm segment and a camber angle sensor mounted to the second bracket arm segment.

DEFINITIONS

"Aspect ratio" of the tire means the ratio of its section height (SH) to its section width (SW) multiplied by 100% for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Camber angle" means the angular tilt of the front wheels of a vehicle. Outwards at the top from perpendicular is positive camber; inwards at the top is negative camber.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Slip angle" means the angle of deviation between the plane of rotation and the direction of travel of a tire.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
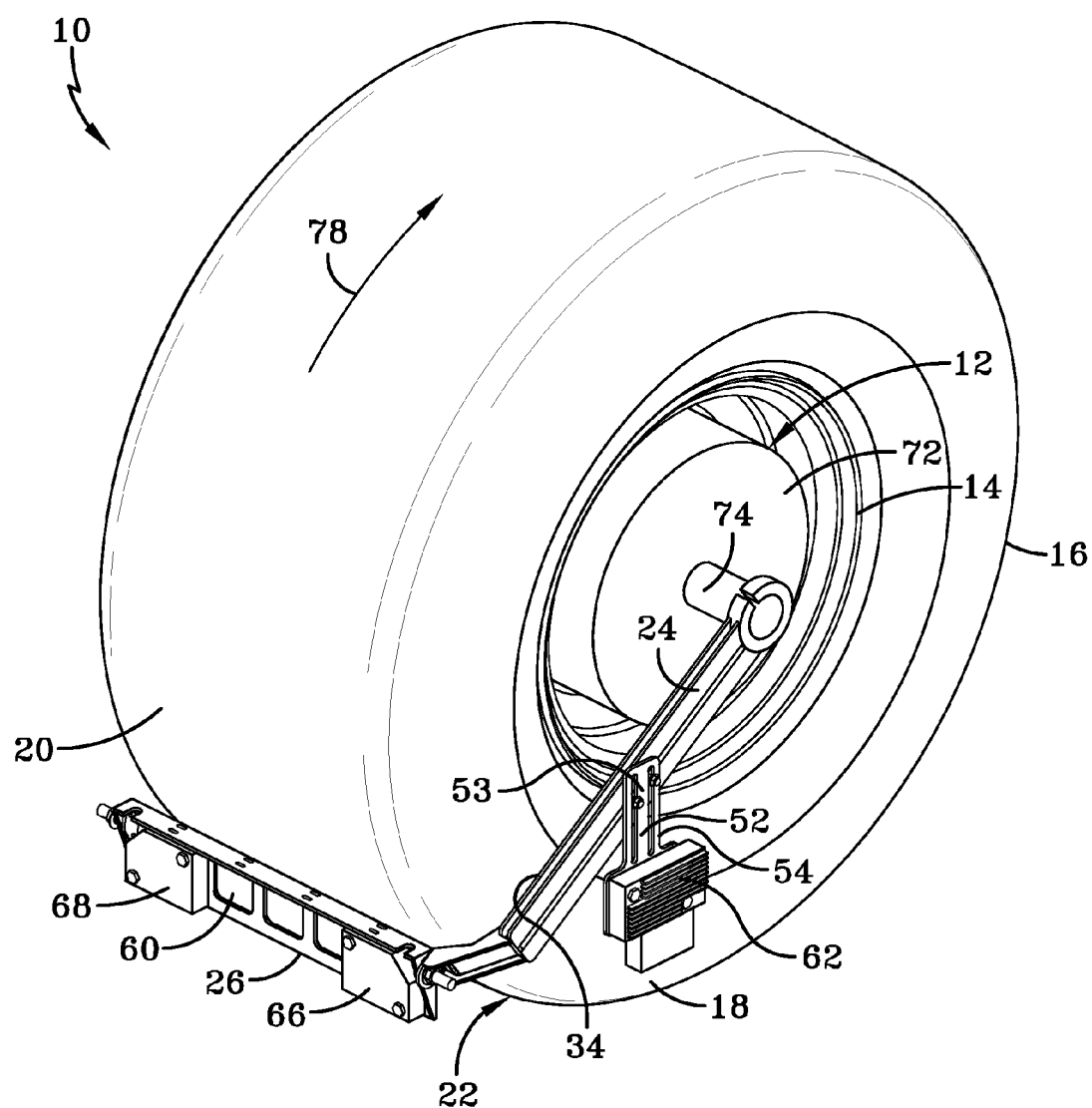
FIG. 1 is a front perspective view of a wheel and sensor assembly configured pursuant to the invention.
Figure 2:
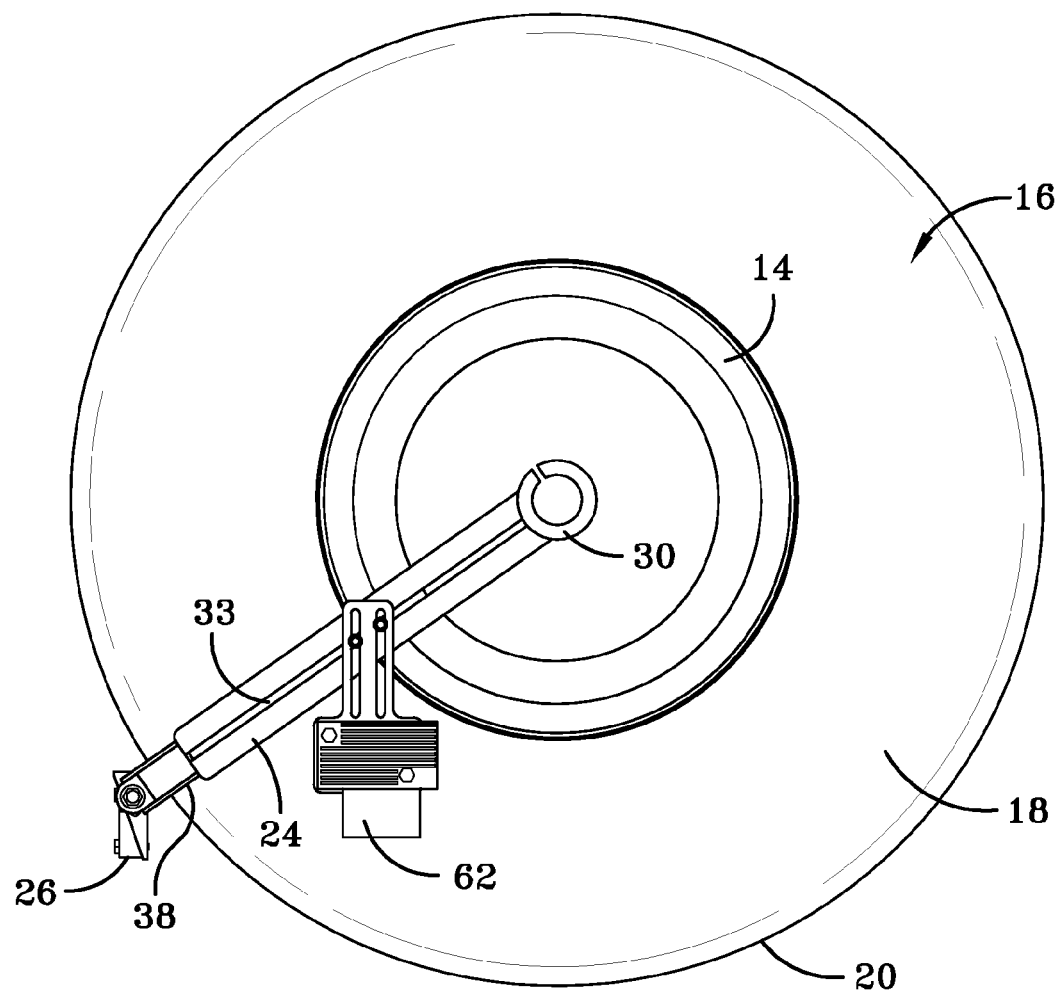
FIG. 2 is a side elevation view thereof.
Figure 3:
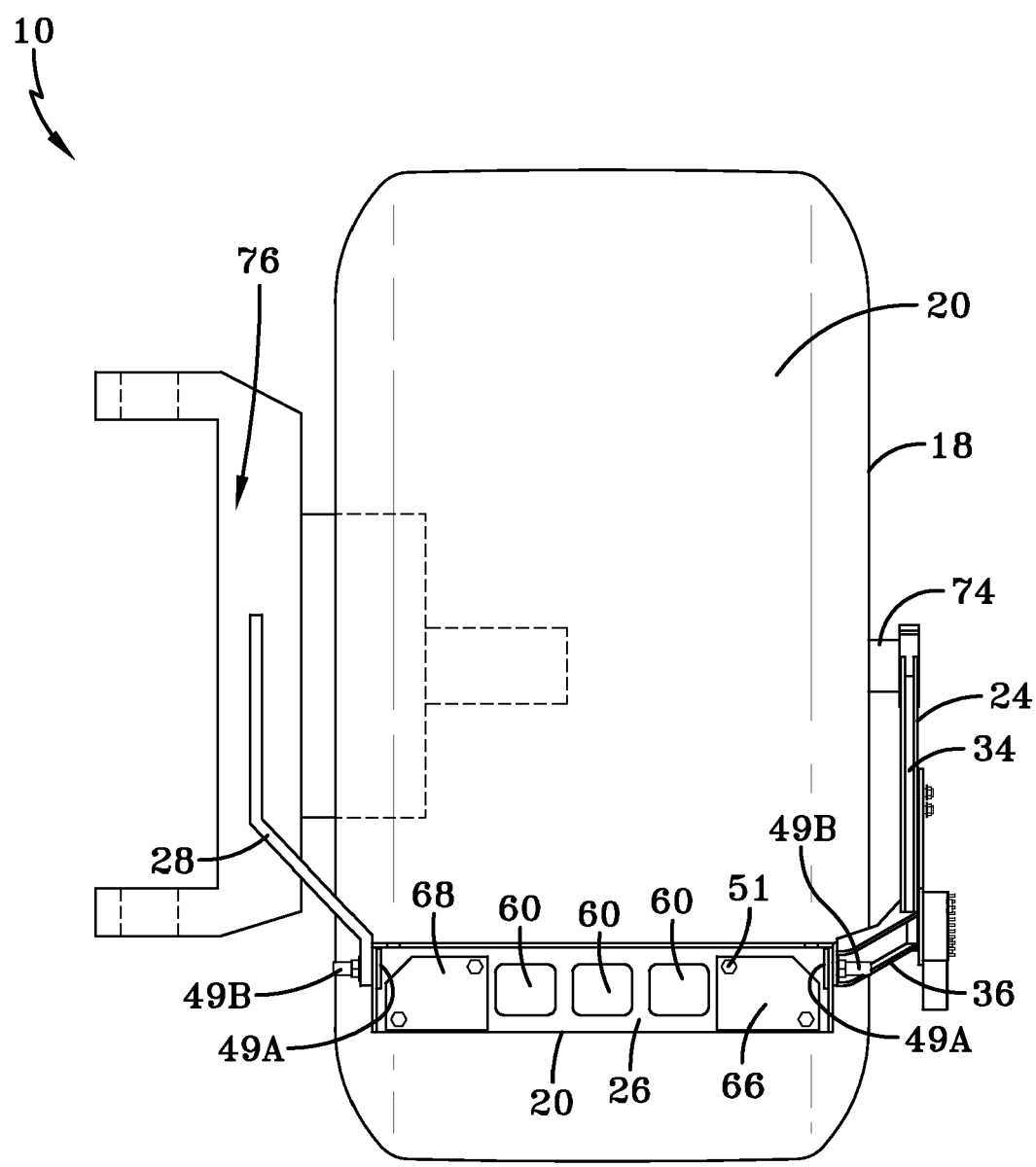
FIG. 3 is a front elevation view thereof.
Figure 4:
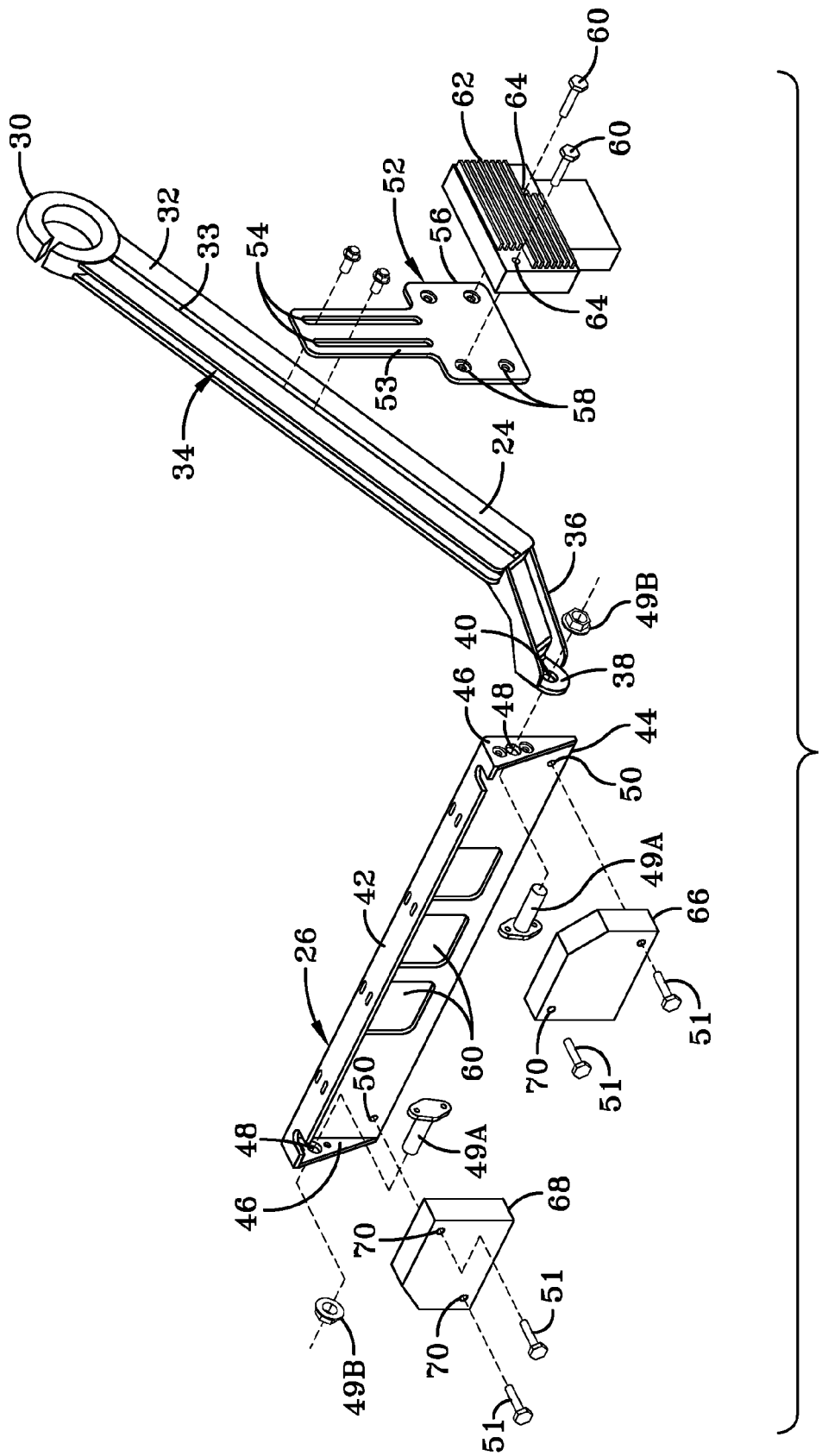
FIG. 4 is an exploded perspective view of the bracket assembly.

Referring to FIGS. 1-4, the subject wheel and sensor assembly 10 is shown to include a wheel assembly 12 in which a tire 16 is mounted to a rim 14 in conventional fashion. The assembly 10 is a component of a vehicle (not shown) such as a passenger car or truck. However, as will be explained, the invention has particular utility in conjunction with measuring tire set-up and performance on a race car. The tire 16 mounted to rim 14 is, accordingly, intended to be of a general depiction without regard to vehicle type or use. The tire 16 is of conventional construction having a sidewall 18 extending to a tread region 20.

The assembly 10 further includes a bracket assembly 22 mounted as shown to the wheel assembly 12. The bracket assembly 22 generally is of U-shape defined by a first bracket arm segment 24, a second bracket arm segment 26 forming the bight of the assembly 22, and a third bracket arm segment 26. Each of the segments 24, 28 has a connector coupling at a remote end, the coupling of segment 24 being in the form of a sized C-clamp 30. The segments forming bracket assembly 22 are formed from suitably sturdy material such as steel. The first segment 24 has an elongate narrow body 32 through which a longitudinal, medially located, slot 33 extends. Extending into an upper edge of the body 32 is a channel 34. The channel 34 extends the length of the body 32 and is sized to admit electrical wiring (not shown) used for power transmission to sensor units mounted to the bracket assembly 22 as well as data transmission from the sensor units as will be explained.

The end segment 36 of the first segment 24 opposite the C-clamp 20 end angles inwardly to a remote flange 38 through which an assembly aperture 40 extends. The second segment 26 of the bracket assembly 22 attaches to the flange 38. The second segment 26 is of elongate construction, generally L-shaped in transverse sectional configuration. The bracket segment 26 is formed by a horizontal elongate side 42 intersecting at a right angle along a longitudinal edge with a vertical side 44. The sides 42, 44 extend between opposite triangular end flanges 46 through which assembly apertures 48 pass. Suitable assembly hardware is provided to affix the segment 26 to the first and third segments 24, 28 such as coupling screws and nuts 49 A, B respectively. Spaced apart apertures 50 extend through the side 44 and serve as mounting locations for sensor device(s) attaching to the side 44 as will be explained. Assembly hardware such as pins 51 are provided for the attachment of sensor units to the side 44.

A mounting plate 52 is included within the bracket assembly 22 and attaches to the body 32 of the arm segment 24. The plate 52 includes a vertical coupling tongue projection 53 having spaced apart elongate mounting slots 54 extending therethrough. A rectangular plate body 56 has appropriately located mounting through apertures 58 sized for attachment hardware such as pins 60. A sensor device 62 mounts to the plate body 56 by means of extension of the pins 60 through the apertures 58. The sensor device 62 is preferably but not necessarily of the type used to measure slip angle of a tire, such as the commercial unit sold by Corrsys-Datron Co. The slip angle sensor device 62 mounts to the mounting plate 52. The plate 52 attaches by set screws 55 extending through plate slots 54 and through the slot 33 along the arm body 32. So attached, the plate 52 and slip angle sensor device 62 affixed thereto depend from the arm body 32 and are repositionable along the arm slot 33 into an optimal location relative to the ground surface for tire slip angle measurement.

A camber angle sensor device is assembled to include a pair of spaced apart laser units 66, 68 that attach through the spaced apart apertures 50 in the second arm segment 26. The sensor device 66, 68 measures camber angle of the tire 16 and are of a commercially available type such as the product sold by Corrsys-Datron Co. The laser units 66, 68 are provided with assembly holes 70 to facilitate attachment to the second arm segment 26. The attachment of the slip angle sensor 62 and camber angle sensors 66, 68 to respective arm segments is preferably effected after the arm segments 24, 26, 28 are mutually assembled into the U-shaped configuration shown in FIGS. 1-3. To attach the completed bracket assembly 22 with the sensor units 62 and 66, 68 to the wheel assembly 12, the U-shaped bracket assembly 22 is positioned in straddling relationship with the tire 16. The ends of the segments 24, 28 attach to components of the wheel assembly 12 on opposite respective sides of the tire 16. In the assembled position, the arm segments 24, 28 extend in a radial direction along opposite sidewalls 18 of the tire 16 and the arm segment 26 extends in an axial direction opposite the tread region 20 of the tire 16. The spacing of the arm segments 24, 28 from respective sidewalls 18 is preferably closely adjacent to position the slip angle sensor 62 as close as possible to the tire sidewall. The close relationship of the sensor 62 with the tire sidewall 18 serves to enhance the accuracy of the slip angle measurement as well as reduce the extent to which the sensor 62 protrudes from the tire. Minimizing the protrusion of the sensor 62 acts to minimize the potential for damaging contact between the sensor 62 and surrounding objects. The sensor 62 includes a downwardly directed laser element that measures the angle of the tire 16 relative to the ground surface during vehicle operation and thereby provides data for the calculation of the slip angle of the tire.

The location of the second arm segment 26 and the camber angle sensor 66, 68 is as shown to be closely adjacent the tread region 20 of the tire 16. Such proximity enhances the accuracy of the camber angle measurement. The mounting of the arm segment 26 is preferable to the side of the wheel assembly 12 opposite the direction of forward vehicle travel 78 in order to protect the arm segment 26 and sensor 66, 68 from damaging contact with surrounding objects. The through passages 60 through the arm segment 26 provide air flow pathways from the rotating tire through the arm segment 26, whereby reducing drag, reducing stresses on the segment 26 and sensor 66, 68, and reducing vibration in the bracket assembly. The sensor units 66, 68 include downwardly directed laser elements that measure to the ground surface and the angular cant of the tire during vehicle operation, whereby providing data for the calculation of the camber angle of the tire.

While the subject bracket assembly 22 and sensor units mounted thereto can effect measurement from tires used in myriad vehicle applications, the assembly is particularly useful and effective in determining the wheel and tire set up in a race car in preparation for a race. The coupling C-clamp 30 of the assembly 22 may be affixed to the stator 74 of a load cell 72 within the wheel assembly 12 as shown. A load cell such as shown at 72 is commercially available from SDI Manufacturing. The opposite arm segment 28 of the bracket assembly 22 may attach to the brake assembly 76 on the opposite side of the wheel. So located and attached, the sensors 62 and 66,68 are located close to the tire 16 to generate accurate camber and slip angle data as well as to minimize the degree to which bracket and sensors protrude. Vehicles may be, in the course of normal operation, particularly in race cars, driven close to outside obstructions and other vehicles. The close proximity and location of the bracket and sensors of the invention to the tire minimizes the risk of contact with such outside influences. Location of the second arm segment and sensor behind the tire, on the opposite side of normatively forward direction of travel 78, likewise protects the bracket and sensor assembly.

While the attach points of the bracket assembly to the wheel assembly 12 are preferably as shown, other means and locations of attachment of the bracket may be employed if desired. In addition, while slip angle and camber angle sensor units 62 and 66, 68 are described above, other types of sensors may be deployed through utilization of the bracket assembly 22 and deployment scheme. For example, without intent to delimit the invention, a tire deflection detector or camera may be mounted to the bracket arm segments 224, 26, 28 and utilized to detect and measure the existence, location, and geometry of tire anomalies during vehicle use. A thermal detector may also be mounted to the bracket assembly 22 to detect the thermal properties of a tire during vehicle use. Power to and data communication from such devices may be wired along the channel 34 of the arm segment 24. The bracket assembly and deployment scheme described above allows for the measurement of the tire 16 while in actual use on a road surface. Such real time evaluation under actual working conditions results in a more thorough and accurate evaluation than laboratory testing. The bracket and sensors measure the tire under actual working conditions to provide not only information on tire performance but also tire response and reaction to a specific track or roadway. For a racecar, for example, specifically correlating tire response and conditional parameters to a particular racetrack is extremely important to the racecar setup.

In addition, mounting the bracket assembly 22 and sensor units to a steer wheel assembly 12 allows for tire evaluation through turns since the bracket assembly 22 and sensor units will turn with the tire. Such capability effects a more thorough and accurate evaluation of the tire and roadway surface than could otherwise be made by the mounting of slip angle and camber angle sensors on the body of the vehicle adjacent to a tire. The subject bracket and sensor assembly turns with the wheel to which it is mounted and measure the slip angle directly as opposed vehicle based sensors that measure the slip angle base on the entire car chassis. Improved accuracy therefore is achieved by the invention assembly.

The channel 34 formed within the arm segment 24 extends the length of the body 32 and is sized to admit electrical wiring (not shown) used for power transmission to sensor units 62 and 66, 68 as well as data transmission from the sensor units to a data storage or collection device. The electrical wiring is thus protected from interfering with the operation of the wheel assembly and from potential damage from contact with foreign objects.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A wheel and sensor assembly, for a vehicle comprising:
    a rotational wheel assembly operatively mounting to a vehicle and including a wheel rim and a tire mounted thereto;
    at least one sensor device for operatively measuring a wheel assembly parameter at least partially while the wheel assembly rotates in operational use on the vehicle;
    a bracket assembly operatively carried by the wheel assembly, the one sensor device mounting to the bracket assembly in a preferred operative location;
    wherein the bracket assembly includes a first bracket arm segment extending at least partially opposite an outer sidewall of the tire in a radial direction; and
    wherein the bracket member includes a second bracket arm segment extending at least partially opposite a tread region of the tire in an axial direction, the assembly including at least one secondary sensor device mounted to the second bracket arm segment adjacent the tread region of the tire.

2. The wheel and sensor assembly of claim 1, wherein the second bracket arm segment is operatively located on a tire side opposite a normatively forward vehicular direction of travel.

3. The wheel and sensor assembly of claim 1, wherein the second bracket arm segment includes at least one through passageway establishing an airflow pathway through the second bracket arm segment.

4. The wheel and sensor assembly of claim 1, wherein the first and second bracket arm segments are mutually disposed at substantially a ninety degree angle.

5. The wheel and sensor assembly of claim 1, wherein the bracket assembly includes a channel positioned to route electrical wiring along the bracket assembly.

6. The wheel and sensor assembly of claim 1, wherein a remote end of the first bracket arm segment operatively connects to a stator from a load cell.

7. The wheel and sensor assembly of claim 6, wherein the bracket assembly includes a third bracket segment extending at least partially along an inner side of the wheel assembly and connecting the second bracket segment to an inward side of the wheel assembly.

8. The wheel and sensor assembly of claim 7, wherein the third bracket segment operatively connects to a brake assembly.

9. The wheel and sensor assembly of claim 1, wherein the bracket assembly includes a first bracket segment extending at least partially along an outer sidewall of the tire in a radial direction at a spatial distance from the outer sidewall of the tire;
    wherein the one sensor device is adjustably repositionable along the bracket assembly;
    wherein the first bracket arm segment operatively maintains the sensor device in said preferred spatial distance from a road surface; and
    wherein the bracket assembly includes a second bracket arm segment extending at least partially along a tread region of the tire in an axial direction, the wheel and sensor assembly including at least one secondary sensor device mounted to the second bracket segment adjacent the tread region of the tire.

10. The wheel and sensor assembly of claim 9, wherein the second bracket arm segment maintains a secondary sensor device in a preferred operative position.

11. The wheel and sensor assembly of claim 9, wherein the second bracket arm segment is operatively positioned adjacent a side of the tire opposite a normatively forward vehicular direction of travel.

12. The wheel and sensor assembly of claim 9, wherein the one sensor device operatively measures slip angle in the tire and the secondary sensor device operatively measures camber angle in the tire as the vehicle traverses a roadway.

* * * * *